R. Thomas.
Building.
No. 1,966. Reissued May 23, 1865.
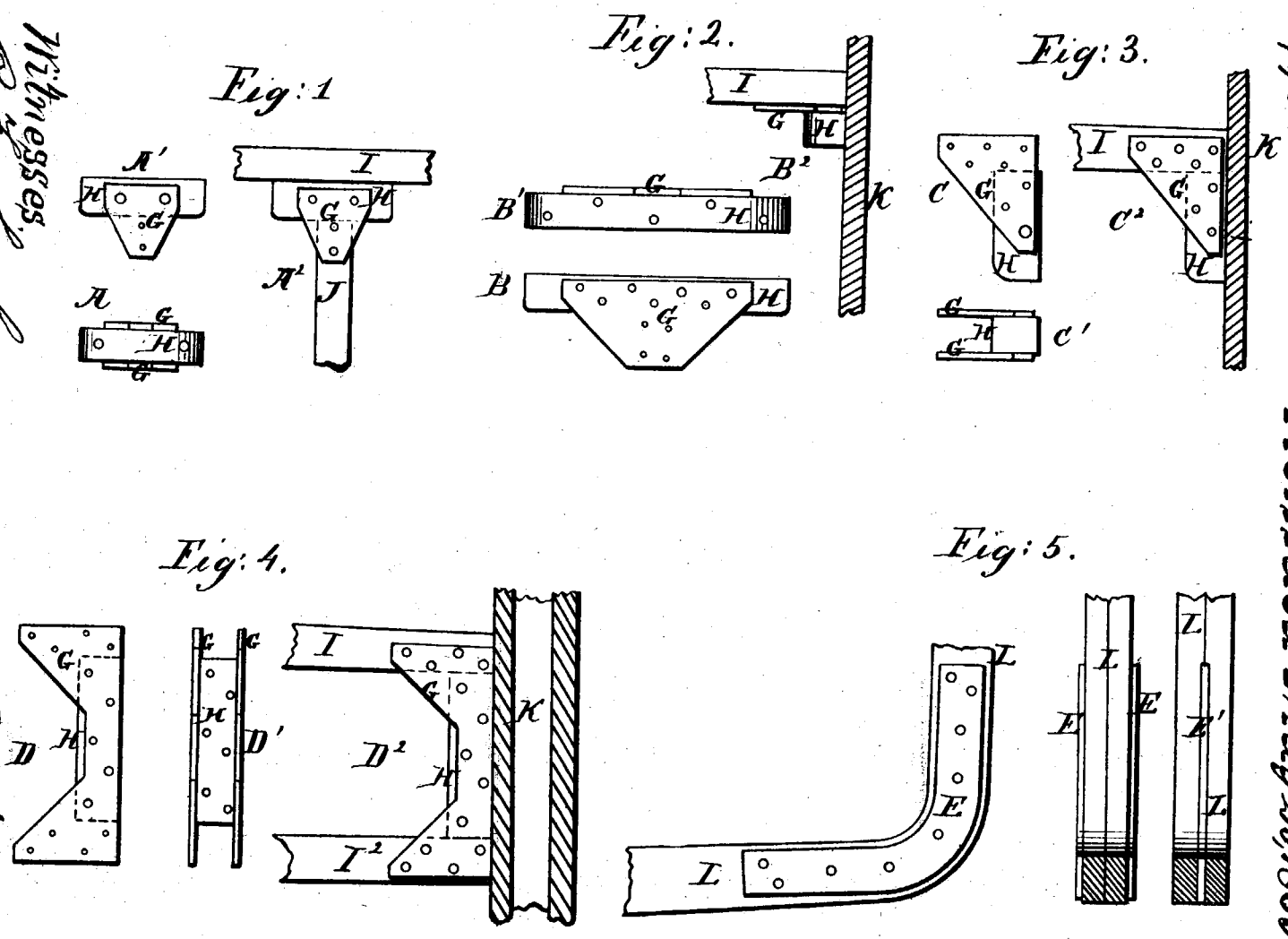
Witnesses.
C. P. Forbush
Geo Wallace
Inventor.
R. H. Thomas
H. PETERS, PHOTO-LITHOGRAPHER, WASHINGTON, D. C.

UNITED STATES PATENT OFFICE.

ROBERT THOMAS, OF BUFFALO, NEW YORK.

IMPROVED SHIP'S-KNEE.

Specification forming part of Letters Patent No. 43,611, dated July 19, 1864; Reissue No. 1,966, dated May 23, 1865.

*To all whom it may concern:*

Be it known that I, ROBERT THOMAS, now a resident of the city of Buffalo, county of Erie, and State of New York, and a native of the Kingdom of Great Britain, have invented a new and Improved Knee Applicable in Ship-Building; and I do hereby declare that the following is a full and exact description thereof, reference being had to the accompanying drawings, making a part of this specification, in which—

Figure I, letter A, is a plan of one form of my improved knee for vessels, applicable to stanchions. A′ is a front view of the same, and $A^2$ shows its application to a stanchion and beam.

Fig. II is another form of knee, applicable to the connection of the beams to the sides of the vessels. B is a plan of the same, B′ is a front view, and $B^2$ shows its connection to a beam and the side of the vessel.

Fig. III shows the same principle applied in another form for connecting the beams to the sides of the vessel. C is a side view, C′ is a top plan view, and $C^2$ shows its connection to the beam and the side of the vessel.

Fig. IV represents the same principle applied in the form of a double or standard knee for securing the upper and lower deck-beams to the side of the vessel, D being a side view, D′ a front view, and $D^2$ shows its connection to the beams and to the side of the vessel.

Fig. V represents my improved method of strengthening the frames of vessels in the bilges, where they are weakest, especially when molded out of straight timbers.

The nature of this invention relates to making a knee for use in the frames of vessels, of an iron plate or plates and a chock of oak or other hard wood firmly bolted together. The iron is to be cut of the desired form and size from boiler or other plate iron in which bolt-holes may be punched, requiring no forging or flanges.

Letters of like name and kind refer to like parts in each of the figures.

G, Figs. I, II, III, and IV represent a piece of iron which is cut into the proper form from a plate of boiler or other plate-iron of equal strength, and hence needs no forging or flanges. This piece of iron is riveted or strongly bolted to an oak or other hard-wood chock, H, which forms a knee of great strength, and is cheap and easy of construction, and used to great advantage in ship-building. When used to secure stanchions, the chock is bolted to the beam, as shown at I, Fig. I, and the projecting part of the iron is bolted to the stanchions, as shown at J. When used for securing a beam, the chock is bolted to the side of the vessel, as shown at K, Fig. III, and the projecting part of the iron bolted to the beam. When a single plate of iron is used and the knee a horizontal one, it may be placed either over or under the beam, as most convenient. These knees can be used either horizontally or perpendicularly, as shown in the drawings. When used horizontally, it will add to the strength of the vessel if the chocks for a whole tier of knees be continued in one piece in the manner of a shelf-piece or stringer. In securing many stanchions, it is also better to make the chock continuous pieces of scantling, the lower one being bolted to the keelson and the upper one to the beams.

The advantages of using this kind of knee is that it occupies less room than a knee made wholly of wood, and holds the fastenings much better than the knees now in general use. It also renders the builder entirely independent of crooked timber-knees, which are daily becoming more difficult to procure. These knees are always accessible to builders, and are easily and readily constructed.

The second part of my invention relates to strengthening the frames of vessels in the bilges, where they are ordinarily the weakest, and more especially so when molded out of straight timber, and relates to preparing and bolting one or sometimes two curved plates of wrought-iron on the sides of the timber, as shown at E, or between the flitch of the frames, as shown at E′, Fig. V.

E and E′ represent the curved iron-plate, and L the bilge-timbers.

The advantages of this mode of strengthening the bilge-timbers is that these iron-plates will compensate for the weakness caused by the foot-hooks being cut across the grain of the wood. It is exceedingly difficult to procure timber with natural crooks or curves for this purpose, and hence it becomes necessary to use straight timber, which, when molded into the proper form, must be cut across the grain, which very much weakens the timber. My improvement affords a remedy for this difficulty. It also permits the use of lighter frames, and obviates the necessity of putting in such heavy bilge-strakes as is now used, and also render unnecessary the expensive and troublesome edge-bolting of the same. Thus I avoid considerable weight and expense in constructing the vessel, while her strength in this very important part is greatly increased.

G H represent my improved ship-knee; I, deck-beam; $I^2$, lower deck-beam; J, stanchion; K, side of the vessel; E E′, curved iron-plates; L, bilge-timbers or foot-hooks.

What I claim as my invention, and desire to secure by Letters Patent, is—

A ship-knee made partly of wood (as represented by the chock H) and partly of iron, (as represented by the iron-plate piece G,) for the purposes, and substantially as set forth.

ROBT. THOMAS.

Witnesses:

E. B. FORBUSH,

GEO. W. WALLACE.